US012760671B2

(12) United States Patent
Conway et al.

(10) Patent No.: US 12,760,671 B2
(45) Date of Patent: Oct. 13, 2026

(54) SYSTEM AND METHOD FOR CARBON DIOXIDE CAPTURE/STORAGE FROM ENGINE EXHAUST

(71) Applicant: Valero Services, Inc., San Antonio, TX (US)

(72) Inventors: Graham T. Conway, San Antonio, TX (US); Thomas E. Briggs, Jr., Helotes, TX (US); Terrence F. Alger, III, San Antonio, TX (US); Jason Daniel Herrera, San Antonio, TX (US)

(73) Assignee: Valero Services, Inc., San Antonio, TX (US)

( * ) Notice: Subject to any disclaimer, the term of this patent is extended or adjusted under 35 U.S.C. 154(b) by 698 days.

(21) Appl. No.: 18/297,806

(22) Filed: Apr. 10, 2023

(65) Prior Publication Data

US 2024/0060438 A1 Feb. 22, 2024

Related U.S. Application Data

(60) Provisional application No. 63/371,687, filed on Aug. 17, 2022.

(51) Int. Cl.
*B01D 53/62* (2006.01)
*F01N 3/08* (2006.01)

(52) U.S. Cl.
CPC .......... *F01N 3/0857* (2013.01); *B01D 53/62* (2013.01); *F01N 2330/06* (2013.01); *F01N 2370/22* (2013.01); *F01N 2570/10* (2013.01); *F17C 2221/013* (2013.01); *F17C 2223/0123* (2013.01); *F17C 2270/0168* (2013.01)

(58) Field of Classification Search
CPC ..... F01N 3/08; F01N 3/02; F17C 5/06; F02M 26/22; B01D 53/14; B01D 67/00; B01D 53/92
See application file for complete search history.

(56) References Cited

U.S. PATENT DOCUMENTS 6,024,774 A 2/2000 Nakagawa et al.
7,572,318 B2 8/2009 Jadhav et al.
7,708,806 B2 5/2010 Wright et al.
(Continued)

FOREIGN PATENT DOCUMENTS

WO 2019202105 10/2019

OTHER PUBLICATIONS

EPA (2022) Inventory of U.S. Greenhouse Gas Emissions and Sinks: 1990-2020. U.S. Environmental Protection Agency, EPA 430-R-22-003. https://www.epa.gov/ghgemissions/inventory-us-greenhouse-gas-emissions-and-sinks, pp. 1-841, U.S.
(Continued)

*Primary Examiner* — Sharon Pregler
(74) *Attorney, Agent, or Firm* — McDermott Will & Schulte LLP; Brian Oaks; Yuhe Liu

(57) ABSTRACT

A system and method for carbon dioxide capture/storage from exhaust utilizing a carbon dioxide separation membrane which may be prepared in the form of a monolithic structure. The captured carbon dioxide may also be stored in a fluid state as supercritical $CO_2$. An integrated fuel delivery and carbon dioxide unloading system is also disclosed, to remove carbon dioxide from a vehicle for sequestration or other industrial purposes.

22 Claims, 4 Drawing Sheets

(56) References Cited

U.S. PATENT DOCUMENTS

| | | | |
|---|---|---|---|
| 7,744,845 | B2 | 6/2010 | Stephenson |
| 7,909,911 | B2 | 3/2011 | Lackner et al. |
| 7,938,893 | B2 | 5/2011 | Doong et al. |
| 8,083,836 | B2 | 12/2011 | Wright et al. |
| 8,088,197 | B2 | 1/2012 | Wright et al. |
| 8,163,065 | B2 | 4/2012 | Lackner et al. |
| 8,337,589 | B2 | 12/2012 | Wright et al. |
| 8,454,732 | B2 | 6/2013 | Huang et al. |
| 12,030,013 | B2 * | 7/2024 | Voice ..................... F02M 26/22 |
| 2003/0232722 | A1 | 12/2003 | Kato et al. |
| 2009/0101008 | A1 | 4/2009 | Lackner et al. |
| 2011/0268636 | A1 | 11/2011 | Lackner et al. |
| 2013/0174739 | A1 * | 7/2013 | Dvininov .............. F01N 3/0857 96/146 |
| 2022/0062860 | A1 | 3/2022 | Belchior et al. |
| 2022/0074358 | A1 | 3/2022 | Briggs, Jr. et al. |

OTHER PUBLICATIONS

Ida, et al., "Mechanism of High-Temperature CO2 Sorption on Lithium Zirconate", Environmental Science and Technology, vol. 37, No. 9, 2003, pp. 1999-2004, Ohio.

Nair, et al., "Lithium based ceramic materials and membranes for high temperature CO2 separation", Progress in Materials Science, vol. 54, 2009, pp. 511-541, Elsevier, Japan/Australia.

Sharma, et al., "Carbon Dioxide Capture from Internal Combustion Engine Exhaust Using Temperature Swing Adsorption", Frontiers in Energy Research, Dec. 16, 2019, vol. 7, Article 143, pp. 1-12, Switzerland.

Zhang, et al., "Additive manufacturing of zirconia ceramics: a state-of-the-art review", Journal of Materials Research and Technology, Elsevier, 2020, vol. 9(4), pp. 9029-9048, Ohio.

International Search Report from related PCT Appln. No. PCT/US2023/072369, dated Feb. 8, 2024.

* cited by examiner

SYSTEM AND METHOD FOR CARBON DIOXIDE CAPTURE/STORAGE FROM ENGINE EXHAUST

CROSS-REFERENCE TO RELATED APPLICATIONS

This application claims the benefit of and priority from U.S. Provisional Application No. 63/371,687 filed Aug. 17, 2022.

FIELD

The present invention is directed at a system and method for carbon dioxide capture/storage from engine exhaust. The captured carbon dioxide may be stored in a fluid state as supercritical $CO_2$. An integrated fuel delivery and carbon dioxide unloading system is also disclosed, to remove carbon dioxide from the exhaust for sequestration or other industrial purposes.

BACKGROUND

Reduction in carbon dioxide ($CO_2$) emissions from exhaust, and in particular vehicular exhaust, has become a focal point of the transportation industry. This is underscored by Environmental Protection Agency (EPA) reports that carbon dioxide ($CO_2$) is the primary greenhouse gas emitted through human activities. In 2020, $CO_2$ accounted for about 79% of all U.S. greenhouse gas emissions from human activities. See, Inventory of U.S. Greenhouse Gas Emissions and Sinks: 1990-2020. U.S. Environmental Protection Agency, EPA 430-R-22-003. U.S. Pat. No. 8,454,732 reports on a membrane composition and process for its formation for the removal of CO2 from mixed gases. The membrane includes a substrate layer comprising inorganic oxides, a barrier layer of in-situ formed $Li_2ZrO_3$, a $Li_2ZrO_3$ sorbent layer and an inorganic oxide cap layer.

A growing need remains for the development of systems and methods for $CO_2$ capture from engine exhaust, and in particular vehicle exhaust, that can preferably be recovered in a fluid state along with integrated fuel delivery system to remove $CO_2$ from the vehicle for other commercial applications.

SUMMARY

A method for selectively capturing and storing carbon dioxide from vehicle exhaust gas comprising providing vehicle exhaust gas that contains carbon dioxide and contacting the vehicle exhaust gas with a carbon dioxide separation membrane comprising a metal oxide selected from the group consisting of $Li_2ZrO_3$, $Li_5AlO_4$, $Li_4SiO_4$, $Li_4TiO_4$, $Li_6Zr_2O_7$, $Li_2CuO_2$, $Li_2SiO_3$, $Na_2ZrO_3$ and mixtures thereof. Carbon dioxide is then removed from the vehicle exhaust followed by converting the removed carbon dioxide from the vehicle exhaust into supercritical carbon dioxide ($sCO_2$) and storing the $sCO_2$ in a vessel in the vehicle.

A system for selectively capturing and storing carbon dioxide from vehicle exhaust gas comprising a carbon dioxide separation membrane comprising a metal oxide selected from the group consisting of $Li_2ZrO_3$, $Li_5AlO_4$, $Li_4SiO_4$, $Li_4TiO_4$, $Li_6Zr_2O_7$, $Li_2CuO_2$, $Li_2SiO_3$, $Na_2ZrO_3$ and mixtures thereof, wherein said membrane is configured to remove carbon dioxide from vehicle exhaust; a cooler configured to receive carbon dioxide removed from the vehicle exhaust; a compressor configured to receive the cooled carbon dioxide and compress the cooled carbon dioxide and form supercritical carbon dioxide ($sCO_2$); and a $sCO_2$ storage vessel to receive the $sCO_2$ from the compressor.

A carbon dioxide separation membrane comprising a monolithic structure wherein the monolithic structure comprises a metal oxide selected from the group consisting of $Li_2ZrO_3$, $Li_5AlO_4$, $Li_4SiO_4$, $Li_4TiO_4$, $Li_6Zr_2O_7$, $Li_2CuO_2$, $Li_2SiO_3$, $Na_2ZrO_3$ and mixtures thereof.

A carbon dioxide separation membrane comprising a plurality of sections or layers of a metal oxide wherein the metal oxide is selected from the group consisting of $Li_2ZrO_3$, $Li_5AlO_4$, $Li_4SiO_4$, $Li_4TiO_4$, $Li_6Zr_2O_7$, $Li_2CuO_2$, $Li_2SiO_3$, or $Na_2ZrO_3$, wherein one section or layer has a first metal oxide ($MO_1$) composition, one section or layer has a second metal oxide composition ($MO_2$), wherein $MO_1$ is compositionally different from $MO_2$.

DETAILED DESCRIPTION

Figure 1:
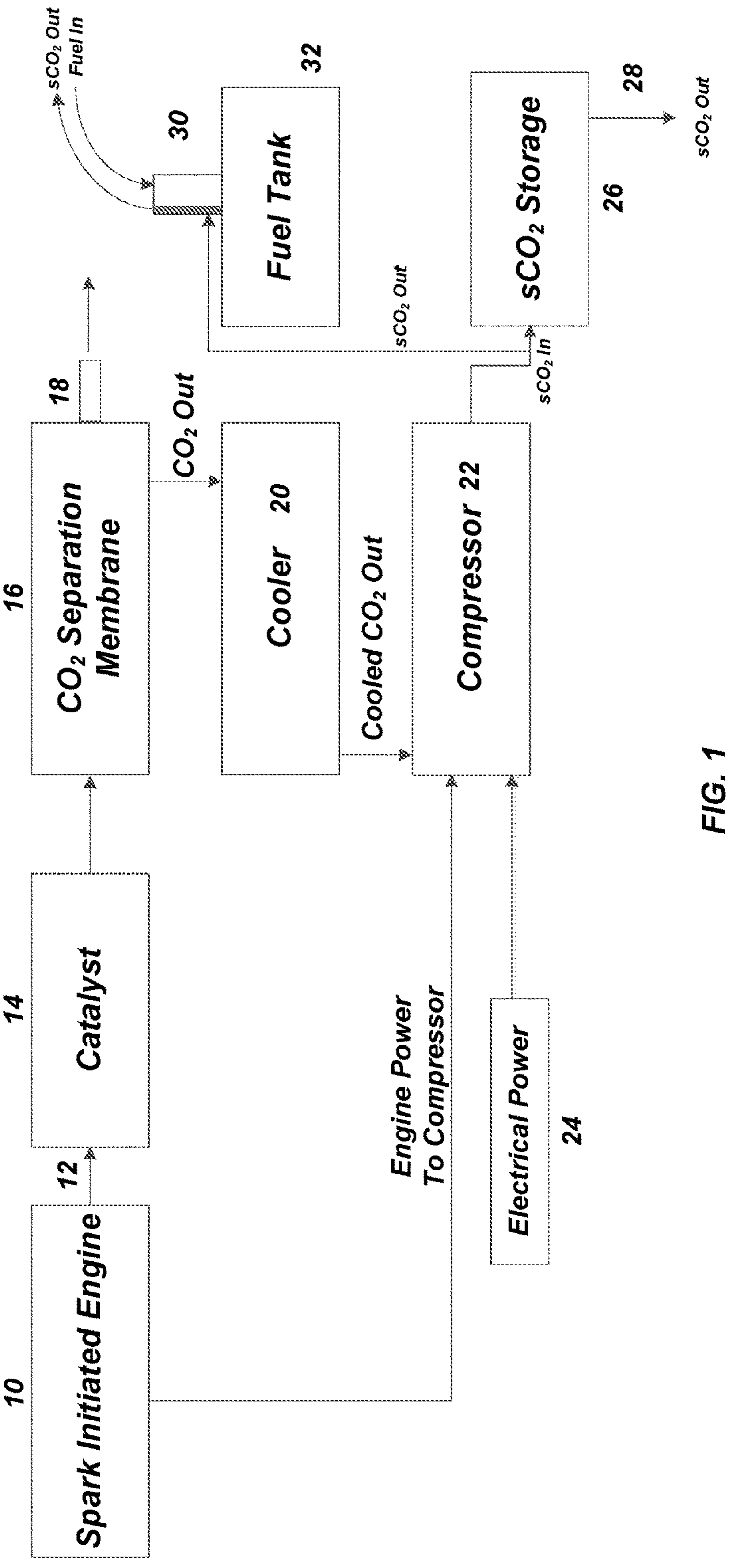
FIG. 1 provides a flow-diagram illustrating the use of a carbon dioxide separation membrane in a spark-initiated engine.

FIG. 1 illustrates a preferred embodiment of the present invention as applied to a spark-initiated internal combustion engine 10 with an exhaust flow 12 that is introduced to catalyst 14. However, in the broad context of the present invention, the $CO_2$ separation membrane herein may be employed in stationery engines or in exhaust stack applications for any system which has elevated $CO_2$ emissions. The discussion herein for an internal combustion engine is therefore exemplary for $CO_2$ separation membrane herein.

In FIG. 1, catalyst 14 may therefore preferably include a three-way catalyst (TWC) which permits conversion of three combustion pollutants, CO, hydrocarbons and NOx. More specifically, reduction of nitrogen oxides into elemental nitrogen and oxygen (NOx→Nx+Ox), oxidation of carbon monoxide to carbon dioxide ($CO+O_2 \rightarrow CO_2$) and oxidation of hydrocarbons into carbon dioxide and water (CxH4x+2xO2→xCO+2x $H_2O$). The output of catalyst 14 now proceeds to the $CO_2$ separation membrane 16. Such separation membrane acts to selectively remove $CO_2$ from the exhaust stream 12, which exhaust stream proceeds out of the engine typically through an engine tailpipe. It is contemplated that 20% or more of the $CO_2$ in the exhaust stream is removed by the separation membrane 16. More preferably, 20% to 90% of the $CO_2$ in the exhaust stream can be removed from the exhaust stream, including all values and increments therein.

Preferably, the $CO_2$ separation membrane 16 is porous and configured to separate $CO_2$ from the exhaust stream at temperatures of at or above 400° C. More preferably, the separation membrane 16 operates in the range of 400° C. to 700° C. The separation membrane itself is preferably selected from the group of metal oxides consisting of $Li_2ZrO_3$, $Li_5AlO_4$, $Li_4SiO_4$, $Li_4TiO_4$, $Li_6Zr_2O_7$, $Li_2CuO_2$, $Li_2SiO_3$, $Na_2ZrO_3$ and mixtures thereof. One particularly preferred separation membrane is $Li_2ZrO_3$.

The membrane can optionally include a substrate layer comprising inorganic oxides, a barrier layer of, e.g., in-situ formed $Li_2ZrO_3$, a $Li_2ZrO_3$ sorbent layer, and an inorganic oxide cap layer. Reference is made to U.S. Pat. No. 8,454,732 whose teachings are incorporated by reference.

The separation membrane may also preferably comprise a porous ceramic substrate containing a layer of the metal oxides noted above, namely $Li_2ZrO_3$, $Li_5AlO_4$, $Li_4SiO_4$, $Li_4TiO_4$, $Li_6Zr_2O_7$, $Li_2CuO_2$, $Li_2SiO_3$, $Na_2ZrO_3$ and mixtures thereof. The porous ceramic itself is selected to that it will preferably withstand the thermal and mechanical stresses imposed in vehicle exhaust use. The ceramic substrate may preferably have a porosity of 20% to 80% including all individual values and increments therein. In such manner, the aforementioned metal oxide(s) are supported by the porous ceramic substrate without the aforementioned requirement of a barrier layer, sorbent layer and inorganic oxide cap layer. More preferably, the separation membrane may comprise a monolithic ceramic honeycomb structure, as disclosed further herein. The ceramic substrate may itself preferably have a thickness of 6.0 mm to 15.0 mm, including all individual values and increments therein. The aforementioned metal oxide(s) are preferably present on the porous ceramic substrate at a thickness in the range of 10.0 μm to 100.0 μm and a porosity from 0 to 30%.

The $CO_2$ existing, the separation membrane and removed from the exhaust, which is at an elevated temperature relative to ambient air, may then be directed to a cooler 20, where it is cooled to a temperature sufficient for introduction into the compressor 22. The temperature of the exhaust may preferably be cooled to fall in the range of 30° C. to 100° C., including all individual values and increments therein. The $CO_2$ that is removed, the membrane which then moves through the cooler to the compressor is preferably done under vacuum, where one may then preferably include a separate vacuum pump.

The compressor 22 is preferably a multi-stage compressor with intercooling between the stages to maintain near isothermal operation to increase the pressure of the cooled $CO_2$ from 1 bar to above 80 bar where the cooled $CO_2$ will enter the supercritical state and become supercritical $CO_2$ ($sCO_2$). Namely $CO_2$ at a temperature above 31.1° and pressures above 1071 psi. It is contemplated, however, that any compressor machinery that can achieve the compression performance to provide $sCO_2$ may be employed, and as illustrated in FIG. 1, the compressor is preferably driven mechanically by the engine. The compressor may also be driven electrically, such as in a hybrid type vehicle, where electrical energy power 24 is stored and available.

The $sCO_2$ is then directed to a $sCO_2$ storage vessel or tank 26 to store the $sCO_2$ until it can be removed from the vehicle, which preferably can occur during a refueling operation. The storage vessel or tank 26 is therefore preferably made of insulating material to contain the $sCO_2$ and can be located at various locations within the vehicle. Preferably, the vessel or tank 26 can have a capacity of 75 kg to 150 kg, including all individual values and increments therein. The preferred size of the vessel or tank 26 can be altered depending upon the fuel utilized, as different fuels will yield different amounts of $CO_2$ per gallon of fuel consumed. The $sCO_2$ storage vessel or tank 26 may itself have a dedicated nozzle 28 for removal/recovery of the $sCO_2$, sourced from the vehicle exhaust, for use in other industrial applications.

The $sCO_2$ contained in storage vessel or tank 26 may also be preferably connected to a nozzle 30 connected to fuel tank 32. The nozzle 30 therefore provides a positive seal with the $sCO_2$ storage tank to maintain the $CO_2$ in the supercritical state as it is removed from the storage vessel or tank 26 at a refueling station. The removed $sCO_2$ may then be directed, e.g., into a $sCO_2$ pipeline for underground sequestration and storage, and again, ultimately for other industrial applications.

Figure 2:
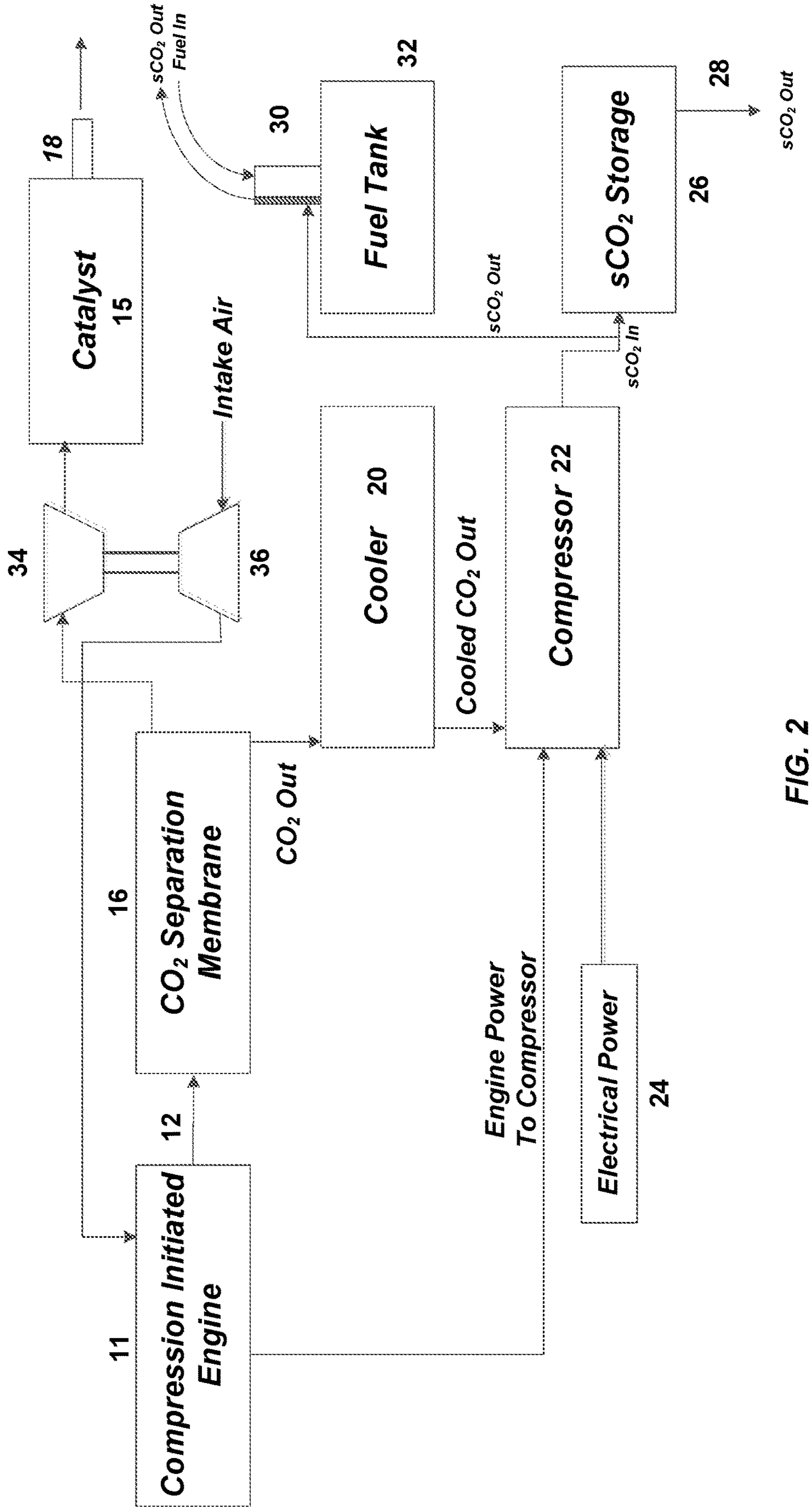
FIG. 2 provides a flow-diagram illustrating the use of a carbon dioxide separation membrane in a compression-initiated engine.

As now illustrated in FIG. 2, the above removal of $CO_2$ from a spark-initiated internal combustion engine can also be configured for a compression-initiated internal combustion engine. For this case, the exhaust exiting the compression-initiated engine 11 is preferably fed directly to the $CO_2$ separation membrane 12 which then similarly provides the output of $CO_2$ to the cooler 20, and then onto compressor 22 for formation of $sCO_2$, which can be stored in a vessel or tank 26. The $CO_2$ that is removed, the membrane which then moves through the cooler to the compressor is preferably done under vacuum, where one may then preferably include a separate vacuum pump. Vessel or tank 26 can again directly provide for removal of $CO_2$ through a dedicated nozzle 28. In addition, the $sCO_2$ storage vessel may again be connected to nozzle 30 that is connected to fuel tank 32 (containing a hydrocarbon fuel) so that the $sCO_2$ can be removed at the time of refueling.

Moreover, the exhaust from the compression-initiated engine, with the $CO_2$ now removed, can then be routed to a turbine 34 connected to a compressor 36 for delivery of compressed air to the intake manifold (not shown) of the compression-initiated engine 11. Similar to the above, it is again contemplated that 20% or more of the $CO_2$ in the exhaust stream from the compression-initiated engine is removed. More preferably, 20% to 90% of the $CO_2$ in the exhaust stream can be removed, including all values and increments therein. This exhaust with such reduced level of $CO_2$ that emerges from the $CO_2$ separation membrane and can then preferably be routed to the turbine 34. The exhaust exiting the turbine can also then be treated by catalyst 15 appropriate for diesel emissions and then expelled through an exhaust tailpipe 18 to the atmosphere.

Figure 3:
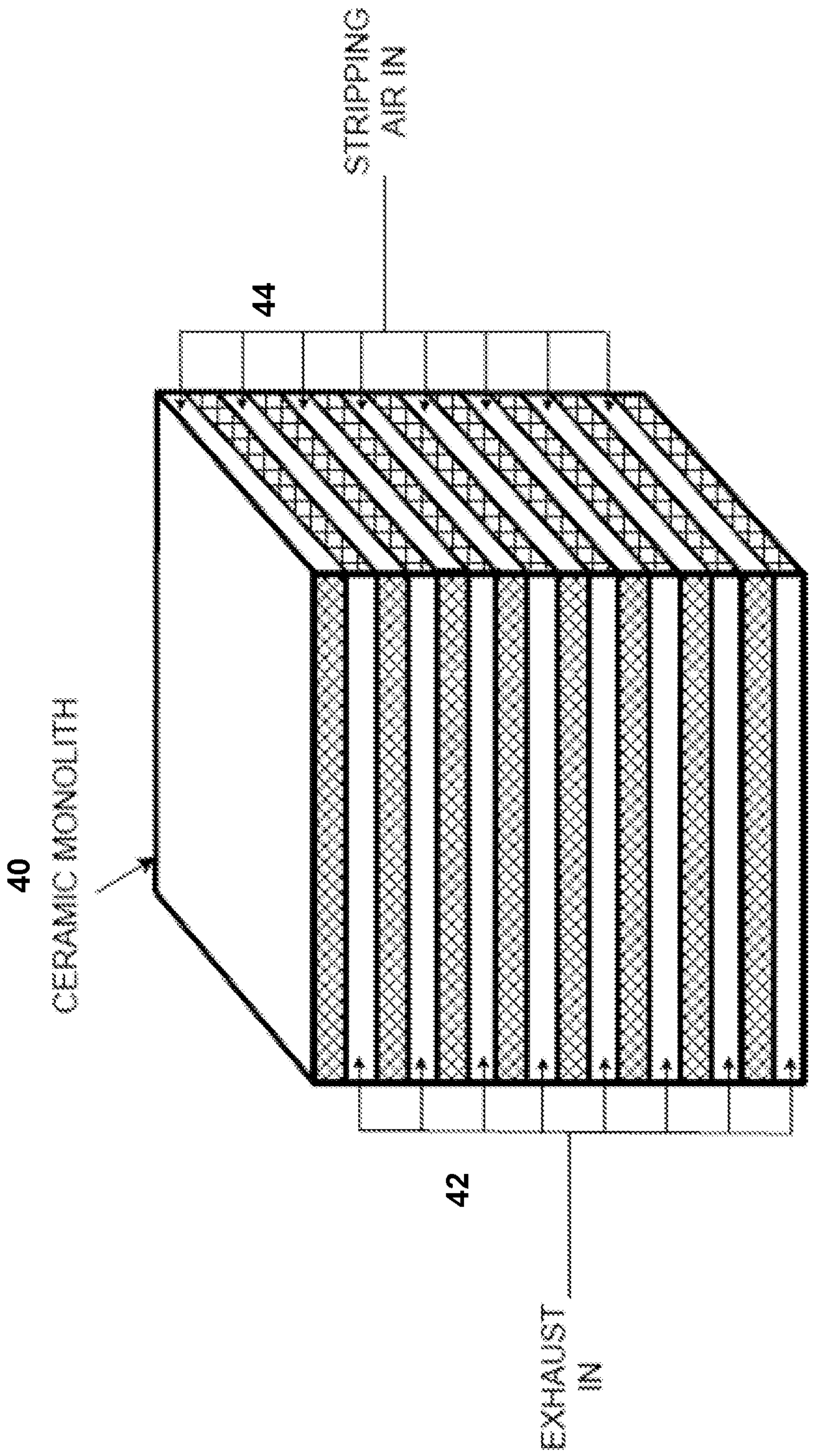
FIG. 3 illustrates a monolithic ceramic honeycomb type structure with $Li_2ZrO_3$ selectively deposited thereon.

As alluded to above, the $CO_2$ separation membrane for use in the vehicle may now in one configuration preferably comprises a monolithic ceramic honeycomb type structure 40, containing a deposited layer of metal oxides noted above, namely $Li_2ZrO_3$, $Li_5AlO_4$, $Li_4SiO_4$, $Li_4TiO_4$, $Li_6Zr_2O_7$, $Li_2CuO_2$, $Li_2SiO_3$, $Na_2ZrO_3$ and mixtures thereof, as illustrated in FIG. 3.

Figure 4:
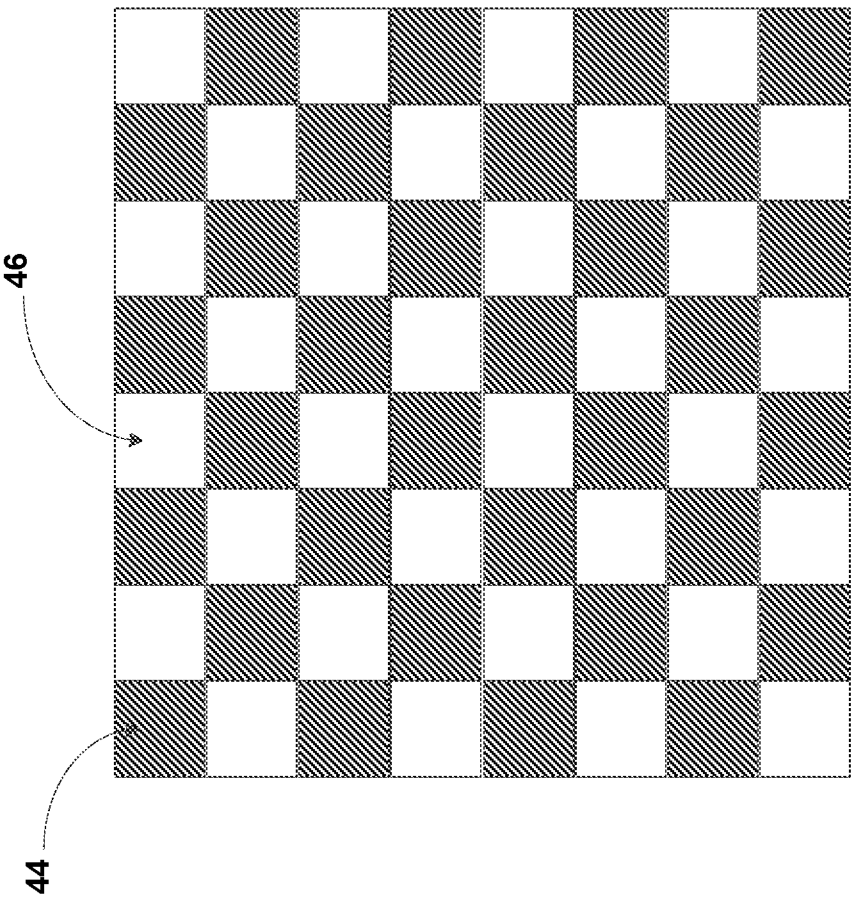
FIG. 4 illustrates a ceramic honeycomb structure where the referenced honeycomb passages are arranged in a grid.

Reference to a ceramic is reference to an inorganic oxide, such as $MgO_2$, $Al_2O_3$ or $SiO_2$. Reference to a honeycomb structure is reference to a lattice of hollow, relatively thin-wall cells, which may be hexagonal or columnar. Reference to monolithic is reference to unitary and continuous ceramic structure, without, e.g., separately adhered layers of ceramic material. The ceramic honeycomb may also be sourced from cordierite ceramic, a magnesium aluminum silicate material. In a preferred configuration, the plurality of exhaust passages 42 in the ceramic structure are preferably arranged at right angles to the plurality of stripping air passages 44. It should also be appreciated that the exhaust passages 42 and stripping air passages 44 may be in the same direction (parallel) or in a fully opposite direction (counterflow). FIG. 4 illustrates another preferred configuration where the above referenced honeycomb passages may preferably be arranged in a grid. As illustrated exhaust channels are shown at 44 and stripping air channels are shown at 46.

It is also worth noting that regardless of the orientation of the channels within the ceramic honeycomb monolith, the preferred feature worth emphasizing is that one provides separate paths for the exhaust flow and the stripping air flow wherein the ceramic containing the layer of metal oxides noted above, namely $Li_2ZrO_3$, $Li_5AlO_4$, $Li_4SiO_4$, $Li_4TiO_4$, $Li_6Zr_2O_7$, $Li_2CuO_2$, $Li_2SiO_3$, $Na_2ZrO_3$ and mixtures thereof, are separating the two air flows. The exhaust flow entering the ceramic honeycomb monolith and entering stripping air may therefore be divided as also shown in FIG. 3.

It is also preferable herein to form the carbon dioxide separation membrane herein directly from the metal oxide, which again preferably includes $Li_2ZrO_3$, $Li_5AlO_4$, $Li_4SiO_4$, $Li_4TiO_4$, $Li_6Zr_2O_7$, $Li_2CuO_2$, $Li_2SiO_3$, $Na_2ZrO_3$ and mixtures thereof. The separation membrane may then preferably be in the form of a one-piece monolithic structure, which is therefore composed of one or more of the above metal oxides without joints or seams. Such monolithic structure may also be made porous and have a porosity in the range of 20% to 80%, including all individual values and increments therein.

In addition, one may provide a plurality of monolithic tubular structures for those applications that may require a tubular style membrane. The monolithic tubes, made of one or more of the aforementioned metal oxides ($Li_2ZrO_3$, $Li_5AlO_4$, $Li_4SiO_4$, $Li_4TiO_4$, $Li_6Zr_2O_7$, $Li_2CuO_2$, $Li_2SiO_3$, $Na_2ZrO_3$ and mixtures thereof) can then be preferably retained or supported in a metal housing.

It should therefore be appreciated that the carbon dioxide separation membrane herein can be made to have a plurality of individual sections or layers, where each section or layer may be selected from one of the following metal oxides: $Li_2ZrO_3$, $Li_5AlO_4$, $Li_4SiO_4$, $Li_4TiO_4$, $Li_6Zr_2O_7$, $Li_2CuO_2$, $Li_2SiO_3$, or $Na_2ZrO_3$. Accordingly, it is contemplated that one may now produce a carbon dioxide separation membrane wherein one section or layer of the membrane is selectively formed from a first metal oxide ($MO_1$) selected from one of $Li_2ZrO_3$, $Li_5AlO_4$, $Li_4SiO_4$, $Li_4TiO_4$, $Li_6Zr_2O_7$, $Li_2CuO_2$, $Li_2SiO_3$, or $Na_2ZrO_3$. Another section or layer of the membrane is then formed from a different metal oxide ($MO_2$) wherein $MO_1$ is compositionally different from $MO_2$. The membrane formed, as noted, can therefore have individual metal oxide layers that are compositionally different, while each provides carbon dioxide separation.

Expanding on the above, one may now therefore form a carbon dioxide separation membrane with a plurality of sections, wherein one section of the separation membrane is formed from a first metal oxide ($MO_1$) and another section of the monolithic separation membrane is formed from a second metal oxide ($MO_2$). Reference to a section of the carbon dioxide separation membrane is a reference to a particular portion or region of the membrane. Again, $MO_1$ is compositionally different from $MO_2$ and the metal oxide is selected from the group consisting of $Li_2ZrO_3$, $Li_5AlO_4$, $Li_4SiO_4$, $Li_4TiO_4$, $Li_6Zr_2O_7$, $Li_2CuO_2$, $Li_2SiO_3$, or $Na_2ZrO_3$.

It is contemplated that the monolithic carbon dioxide membrane made of metal oxide is preferably formed herein by one or more of the following contemplated techniques:

Sintering: This involves heating the metal oxide powder at relatively high temperatures to form a solid, rigid structure. During sintering, the metal oxide powder particles are heated to a temperature where they fuse together, forming a solid mass. The temperature required for sintering depends on the composition of the powder, but preferably ranges from 1200° C. to 1600° C.

Hot pressing: This involves applying pressure and heat simultaneously to the metal oxide powder to create a relatively dense, rigid structure. The powder is placed in a die and then heated to a temperature below its melting point. A hydraulic press may be used to apply pressure to the metal oxide powder, compacting it into a dense structure. The temperature and pressure required for hot pressing depends on the composition of the powder, but preferably ranges from 1000 to 1500° C. and 50 to 200 MPa.

Cold pressing and sintering: This technique involves compacting the metal oxide powder into a specific shape using a cold press, followed by sintering to create a relatively rigid structure. In this process, the metal oxide powder is first pressed at room temperature using a die and press, forming a compact. The compact is then sintered at high temperature to form the desired membrane.

Tape casting: This is a process in which a slurry of the metal powder is cast onto a flexible substrate, such as a polymer film, and then dried to create a thin, flexible sheet. The sheet can then be cut into the desired shape and sintered to create the desired membrane.

Additive manufacturing: This is a process in which the metal oxide powder is layered in a specific pattern using a 3D printer or similar device, creating a solid structure. The layers are bonded together using heat or a chemical process, creating a relatively rigid structure. Specific examples of additive manufacturing are contemplated to include: selective laser sintering, selective laser melting, stereo-lithography, fused deposition modelling and direct energy deposition As therefore may now be further appreciated, one may form a carbon dioxide separation membrane whereby utilizing compositionally different metal oxides at different layers or sections of the membrane, one can provide a carbon dioxide separation membrane that provides individual layers or sections with different temperature activation requirements to activate the membrane for removal of carbon dioxide. Accordingly, carbon dioxide separation can now be made to selectively activate with temperature at any given layer or section of the membrane, as a function of metal oxide composition, which membrane section then operates to remove carbon dioxide.

As can now be appreciated, the disclosure herein provides a system and method for carbon dioxide capture/storage from engine exhaust, and in particular vehicular engine exhaust. This system and method are contemplated to be particularly beneficial where fuels with relatively low or zero carbon intensity are utilized. These fuels are derived from renewal resources such as biomass or solar/wind energy. With such fuels, it is contemplated that the carbon dioxide capture/storage herein will turn the overall carbon cycle for the vehicle into a net negative carbon source (i.e., the vehicle removes carbon dioxide from the atmosphere on balance). By way of example, for a vehicle operating on 100% ethanol, only around 20% of the exhaust carbon dioxide must be captured and stored before the total carbon dioxide emission is net negative for the vehicle.

What is claimed is:

1. A method for selectively capturing and storing carbon dioxide from exhaust gas comprising:

providing exhaust gas that contains carbon dioxide;

contacting said exhaust gas with a carbon dioxide separation membrane comprising a metal oxide selected from the group consisting of $Li_2ZrO_3$, $Li_5AlO_4$, $Li_4SiO_4$, $Li_4TiO_4$, $Li_6Zr_2O_7$, $Li_2CuO_2$, $Li_2SiO_3$, $Na_2ZrO_3$ and mixtures thereof, wherein said carbon dioxide separation membrane is configured to remove carbon dioxide from said exhaust gas;

converting the removed carbon dioxide from said exhaust into supercritical carbon dioxide ($sCO_2$) and storing said $sCO_2$ in a vessel.

2. The method of claim 1 wherein said carbon dioxide membrane comprises $Li_2ZrO_3$ on a ceramic support.

3. The method of claim 1 wherein said exhaust is exhaust from a spark-initiated internal combustion engine.

4. The method of claim 1 wherein said exhaust is exhaust from a compression-initiated internal combustion engine.

5. The method of claim 2 wherein said ceramic support comprises a ceramic monolithic structure.

6. The method of claim 1 wherein 20% or more of the carbon dioxide in said exhaust is removed by said carbon dioxide separation membrane.

7. The method of claim 1 wherein 20% to 90% of the carbon dioxide in said exhaust is removed by said carbon dioxide separation membrane.

8. The method of claim 1 wherein said stored $sCO_2$ in said vessel is connected to a nozzle of a vessel fuel tank wherein said stored $sCO_2$ is configured to be removed from said vessel when said fuel tank is refueled.

9. The method of claim 1 wherein said carbon dioxide separation membrane comprises a monolithic structure.

10. The method of claim 1 wherein said carbon dioxide separation membrane comprises a plurality of sections or layers of a metal oxide wherein the metal oxide is selected from the group consisting of $Li_2ZrO_3$, $Li_5AlO_4$, $Li_4SiO_4$, $Li_4TiO_4$, $Li_6Zr_2O_7$, $Li_2CuO_2$, $Li_2SiO_3$, or $Na_2ZrO_3$, wherein one section or layer has a first metal oxide ($MO_1$) composition, one section or layer has a second metal oxide composition ($MO_2$), wherein $MO_1$ is compositionally different from $MO_2$.

11. A system for selectively capturing and storing carbon dioxide from exhaust gas comprising:

a carbon dioxide separation membrane comprising a metal oxide selected from the group consisting of $Li_2ZrO_3$, $Li_5AlO_4$, $Li_4SiO_4$, $Li_4TiO_4$, $Li_6Zr_2O_7$, $Li_2CuO_2$, $Li_2SiO_3$, $Na_2ZrO_3$ and mixtures thereof, wherein said carbon dioxide separation membrane is configured to remove carbon dioxide from exhaust gas;

a cooler configured to receive carbon dioxide removed from said exhaust gas;

a compressor configured to receive said cooled carbon dioxide and compress said cooled carbon dioxide and form supercritical carbon dioxide ($sCO_2$); and a $sCO_2$ storage vessel to receive the $sCO_2$ from said compressor.

12. The system of claim 11 wherein said carbon dioxide separation membrane comprises $Li_2ZrO_3$ on a ceramic support.

13. The system of claim 11 wherein said exhaust is exhaust from a spark-initiated internal combustion engine.

14. The system of claim 11 wherein said exhaust is exhaust from a compression-initiated internal combustion engine.

15. The system of claim 12 wherein said ceramic support comprises a ceramic monolithic structure.

16. The system of claim 11 wherein 20% or more of the carbon dioxide in said exhaust is removed by said carbon dioxide separation membrane.

17. The system of claim 11 wherein 20% to 90% of the carbon dioxide in said exhaust is removed by said carbon dioxide separation membrane.

18. The system of claim 11 wherein said $sCO_2$ storage vessel is connected to a nozzle of a vessel fuel tank wherein said stored $sCO_2$ is configured to be removed from said vessel when said fuel tank is refueled.

19. The system of claim 11 wherein said carbon dioxide separation membrane comprises a monolithic structure.

20. The system of claim 11 wherein said carbon dioxide separation membrane comprises a plurality of sections or layers of a metal oxide wherein the metal oxide is selected from the group consisting of $Li_2ZrO_3$, $Li_5AlO_4$, $Li_4SiO_4$, $Li_4TiO_4$, $Li_6Zr_2O_7$, $Li_2CuO_2$, $Li_2SiO_3$, or $Na_2ZrO_3$, wherein one section or layer has a first metal oxide ($MO_1$) composition, one section or layer has a second metal oxide composition ($MO_2$), wherein $MO_1$ is compositionally different from $MO_2$.

21. A carbon dioxide separation membrane comprising a monolithic structure wherein said monolithic structure comprises a metal oxide selected from the group consisting of $Li_2ZrO_3$, $Li_5AlO_4$, $Li_4SiO_4$, $Li_4TiO_4$, $Li_6Zr_2O_7$, $Li_2CuO_2$, $Li_2SiO_3$, $Na_2ZrO_3$ and mixtures thereof, and wherein said carbon dioxide separation membrane is configured to remove carbon dioxide from exhaust gas.

22. A carbon dioxide separation membrane comprising a plurality of sections or layers of a metal oxide wherein the metal oxide is selected from the group consisting of $Li_2ZrO_3$, $Li_5AlO_4$, $Li_4SiO_4$, $Li_4TiO_4$, $Li_6Zr_2O_7$, $Li_2CuO_2$, $Li_2SiO_3$, or $Na_2ZrO_3$, wherein one section or layer has a first metal oxide ($MO_1$) composition, one section or layer has a second metal oxide composition ($MO_2$), wherein $MO_1$ is compositionally different from $MO_2$, and wherein said carbon dioxide separation membrane is configured to remove carbon dioxide from exhaust gas.

* * * * *